C. G. HOWARD & E. G. KINNEY.
TIRE RELINER.
APPLICATION FILED JAN. 20, 1914.

1,127,626.

Patented Feb. 9, 1915.
2 SHEETS—SHEET 1.

Witnesses

Inventors
Claude G. Howard
Edward G. Kinney
By Victor J. Evans
Attorney

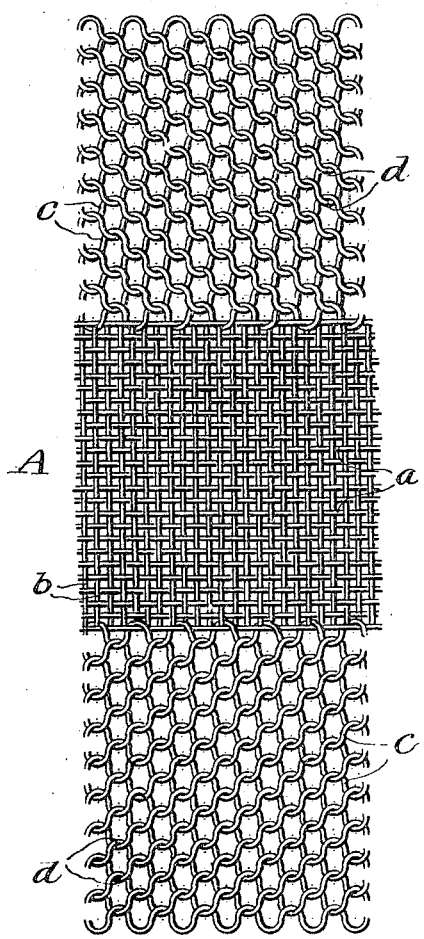
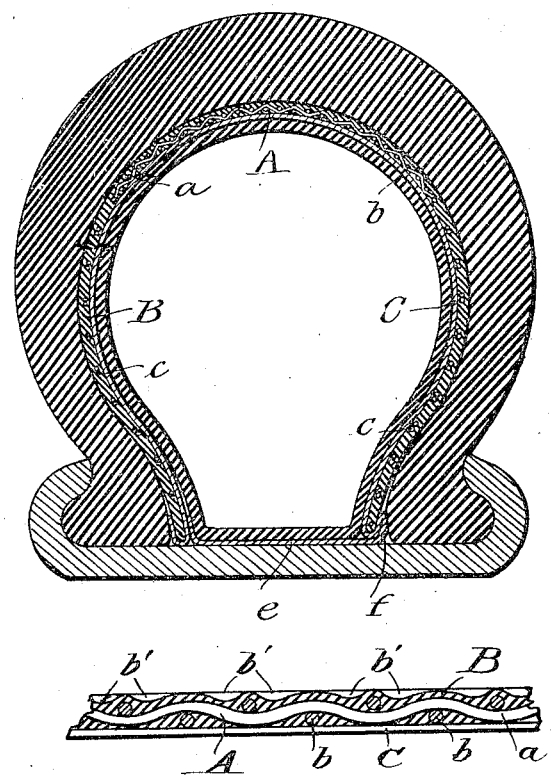
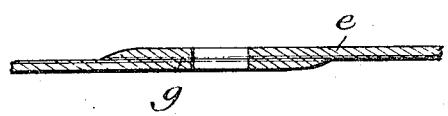

UNITED STATES PATENT OFFICE.

CLAUDE G. HOWARD AND EDWARD G. KINNEY, OF RICE LAKE, WISCONSIN.

TIRE-RELINER.

1,127,626. Specification of Letters Patent. Patented Feb. 9, 1915.

Application filed January 20, 1914. Serial No. 813,284.

*To all whom it may concern:*

Be it known that we, CLAUDE G. HOWARD and EDWARD G. KINNEY, citizens of the United States, residing at Rice Lake, in the county of Barron and State of Wisconsin, have invented new and useful Improvements in Tire-Reliners, of which the following is a specification.

This invention relates to reliners for pneumatic tires, the broad object of the invention being to produce a simple, cheap and reliable device of the character referred to which may be applied to the outer case or shoe of any pneumatic tire and which will form a thorough support and reinforcement therefor and prevent punctures, blow outs and many other troubles to which tires of this class are subject.

A more specific object of the present invention is to produce a reliner embodying a tension sheet of novel and effective construction whereby the side portions or walls of the tire retain their resiliency and flexibility, while at the same time the tread portion as well as the side walls of the tire are thoroughly supported and sustained under an excessive internal pressure even as high as one hundred and fifty pounds to the square inch.

A further object of the invention is to so construct and combine a tension sheet and a covering sheet of rubber applied to said tension sheet, as to produce a multiplicity of vacuum cups which will obtain a hold on the inner surface of the outer case or shoe and thereby prevent any possibility of the reliner creeping longitudinally of the outer case.

With the above and other objects in view, the invention consists in the novel construction, combination and arrangement of parts, as will hereinafter be more fully described, illustrated and claimed.

Figure 1:
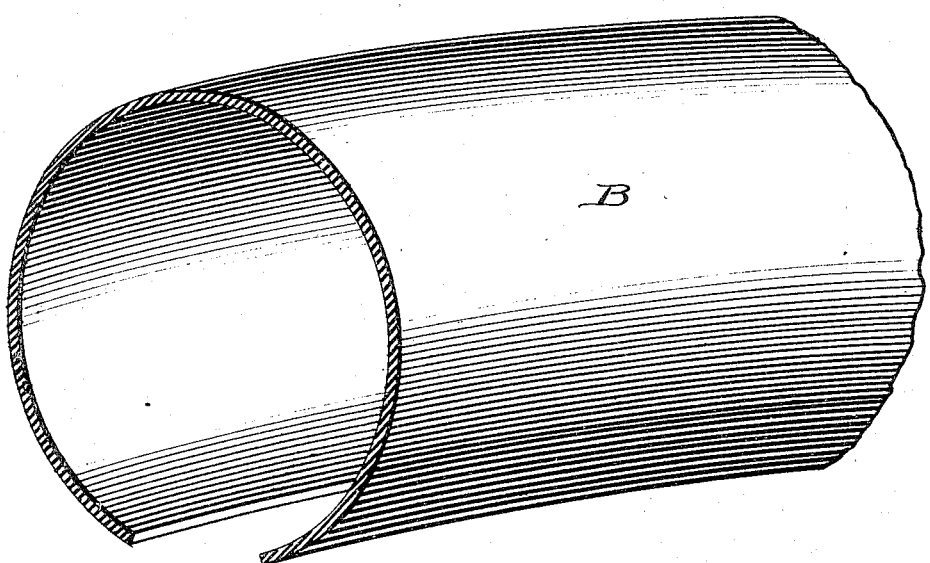
Figure 2:
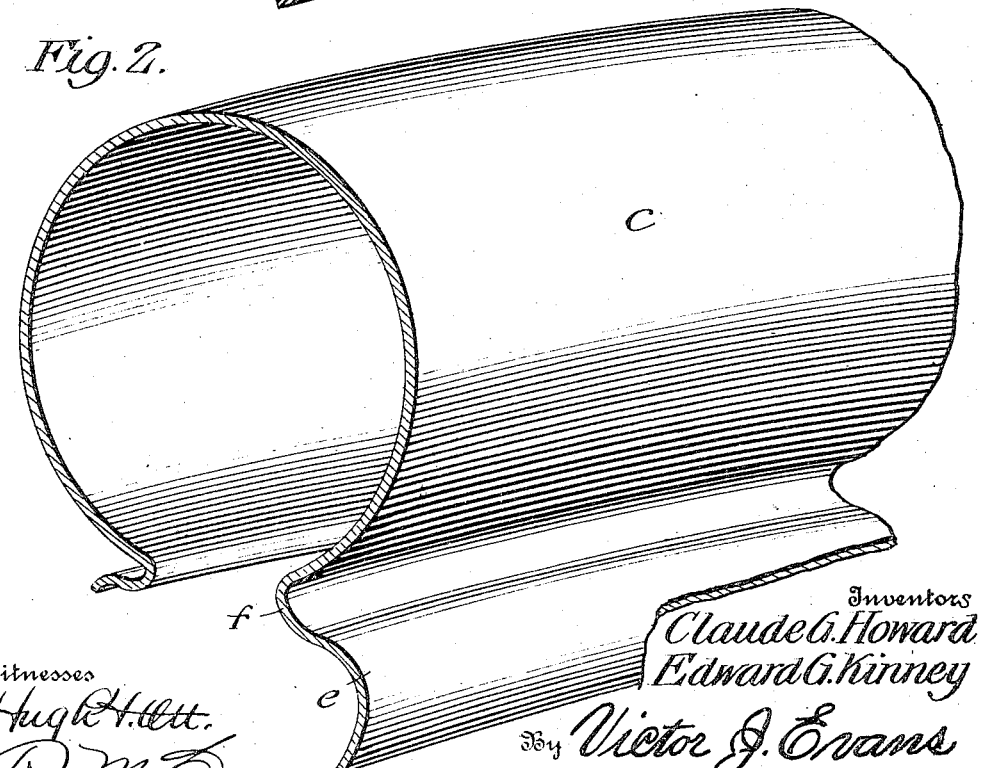

In the accompanying drawings:—Figure 1 is a perspective view of the outer filler or vacuum cup sheet of the improved reliner. Fig. 2 is a similar view of the inner sheet. Fig. 3 is a plan view of the tension sheet. Fig. 4 is a cross section through the complete reliner. Fig. 5 is a longitudinal section through a portion of the reliner showing the overlapped arrangement of the ends of the reliner. Fig. 6 is an enlarged fragmentary section illustrating the vacuum cups.

The tension sheet of the reliner of this invention is illustrated in plan view or spread out condition in Fig. 3 wherein it will be observed that the central or tread portion of the tension sheet is composed of wires $a$ extending longitudinally of the tire and other wires $b$ extending transversely of the tire, said wires crossing each other in perpendicular relation and being dip-soldered or otherwise firmly connected together at their points of crossing or intersection. This renders the tread portion of the tension sheet non-extensible or non-stretchable both longitudinally and transversely and the meshes are large, there being about ten wires to the inch so as to produce vacuum cup forming spaces or meshes between the wires as will hereinafter appear.

The opposite side portions of the tension sheet are formed of wires $c$ extending longitudinally of the tire, each of said wires being of serpentine form or provided with oppositely extending crimps or bends $d$, the bends or crimps of one wire being interwoven with the corresponding portions of the wires lying at opposite sides thereof. This provides for the necessary flexibility of the side portions of the tension sheet to accommodate the bending of the side walls of the outer case or shoe of a pneumatic tire without injuring the tension sheet and without impairing the pressure sustaining quality thereof. In the preferred embodiment of the invention the wires are so bent and interwoven as to produce the practical equivalent of hinge joints occurring about every one-fourth of an inch and in parallel planes throughout the entire area of the side portions of the tension sheet.

The tension sheet is of a width fully equal to the width of the outer case or shoe and therefore entirely covers or lines the inner surface thereof. The length of the tension sheet is such that the opposite ends thereof are allowed to overlap to a sufficient extent to permit holes to be formed therein for the reception of the valve tube whereby the inner tube is inflated.

In connection with the tension sheet to which the general reference character A has been applied, we employ an outer vacuum sheet B and an inner protective sheet C. The vacuum cup sheet B consists of a sheet of soft rubber about one-eighth of an inch in thickness and of the same length and width as the tension sheet above described. This vacuum cup sheet is applied to that side of the tension sheet which comes next to the inner surface of the outer case or shoe of the tire, and the vacuum cups b' formed by the unsupported portions of the sheet B obtain a grip on said outer case.

The inner sheet C consists of textile fabric such as canvas of a sufficiently heavy character, said sheet being of the same size as the other sheets A and B and being cut on the bias, that is to say, with the threads running obliquely or diagonally of the sheet, the object of which is to allow for the necessary stretching of said inner sheet. The inner sheet C is made considerably wider than the other two sheets A and B, a one inch flap being left along one edge so as to enable it to be folded over the edge of the sheets A and B. At the opposite side a relatively wide flap, four inches more or less, is left extending beyond the corresponding marginal edges of the sheets A and B, said flap designated at e being designed to lay against the rim so as to prevent the inner tube from chafing against the rim. At the point f the textile sheet C is folded over the edges of the sheets A and B to cover said edges and particularly the edge of the tension sheet. The sheet C is rubberized or, in other words, has a thin coating of liquid rubber applied to the face thereof which lies next to the tension sheet A. After the sheets A, B and C have been combined in the manner hereinabove described, the two ends of the composite structure are then brought together in overlapping relation as shown in Fig. 5 and the whole is then vulcanized forming a single reliner unit. The overlap indicated at g forms a reinforce through which the hole is formed for the ordinary inflating valve tube.

It will be understood from the foregoing description that the reliner hereinabove described is designed to be inserted within the outer case or shoe of a tire or between said outer case and the inner tube. When constructed in the manner above referred to, said reliner will practically prevent many of the blow outs and punctures now so common and said reliner is particularly adapted to old outer cases or shoes which at the present time are necessarily thrown away and abandoned. A reliner of the character above described, applied to the average discarded outer shoe will render said shoe useful for several thousand additional miles as the particular formation of the tension sheet provides for the non-stretching of the tread portion thereof and at the same time for the flexure of the side portions which support the side walls of the outer case. The strain is thus distributed throughout the entire reliner without any interference with the flexibility thereof. The reliner may, of course, be changed from one casing to another. Practically no wear occurs between the reliner and the outer casing of the tire for the reason that the multiple vacuum cups prevent any relative sliding or creeping movement between the reliner and said outer case. Again the particular construction of the tension sheet enables a machine to be driven on a flat tire for a very considerable distance without injuring or in the least impairing the efficiency of the reliner. The reliner is also of less weight than those now in common use and composed of multiple layers of rubberized fabric.

What we claim is:—

1. A reliner for pneumatic tires embodying an inclosed tension sheet of meshed wire fabric in the tread portion of which the wires run longitudinally and transversely of the tire and are united at the crossing points, and in the side portions of which the wires run longitudinally of the tire and are of serpentine shape and interwoven with each other to admit of flexure along parallel longitudinal lines, and other sheets covering the opposite faces of said tension sheet, the whole being vulcanized into a reliner unit.

2. A reliner for pneumatic tires embodying an inclosed tension sheet of meshed wire fabric in the tread portion of which the wires run longitudinally and transversely of the tire and are united at the crossing points, and in the side portions of which the wires run longitudinally of the tire and are of serpentine shape and interwoven with each other to admit of flexure along parallel longitudinal lines, and other sheets covering the opposite faces of said tension sheet, one of said other sheets consisting of soft rubber having depressions at the meshes of the tread wires which form vacuum cups to engage the outer case of the tire, the whole being vulcanized into a reliner unit.

3. A reliner for pneumatic tires embodying an inclosed tension sheet of meshed wire fabric in the tread portion of which the wires run longitudinally and transversely of the tire and are united at the crossing points, and in the side portions of which the wires run longitudinally of the tire and are of serpentine shape and interwoven with each other to admit of flexure along parallel longitudinal lines, and other sheets covering the opposite faces of said tension sheet, one of said other sheets consisting of soft rubber having depressions at the meshes of the tread wires which form vacuum cups to engage the outer case of the tire, the remaining sheet consisting of textile fabric cut on the bias and extending laterally beyond one marginal edge of the tension and vacuum cup sheets to form a protecting flap for the inner tube, the whole being vulcanized into a reliner unit.

In testimony whereof we affix our signatures in presence of two witnesses.

CLAUDE G. HOWARD.
EDWARD G. KINNEY.

Witnesses:
M. O. BRADY,
C. A. STARK.

Copies of this patent may be obtained for five cents each, by addressing the "Commissioner of Patents, Washington, D. C."